(12) United States Patent
Hartmann et al.

(10) Patent No.: US 8,959,990 B2
(45) Date of Patent: Feb. 24, 2015

(54) ARRANGEMENT OF A TIRE PRESSURE SENSOR UNIT

(71) Applicant: Bayerische Motoren Werke Aktiengesellschaft, Munich (DE)

(72) Inventors: Jochen Hartmann, Mering (DE); Axel Schwab, Munich (DE); Michael Meier, Haar (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 13/949,633

(22) Filed: Jul. 24, 2013

(65) Prior Publication Data

US 2013/0305818 A1 Nov. 21, 2013

Related U.S. Application Data

(63) Continuation of application No. PCT/EP2011/071554, filed on Dec. 1, 2011.

(30) Foreign Application Priority Data

Jan. 25, 2011 (DE) .......................... 10 2011 003 134

(51) Int. Cl.
*G01M 17/02* (2006.01)
*B60C 23/04* (2006.01)
*B29C 73/22* (2006.01)

(52) U.S. Cl.
CPC ............. *B60C 23/04* (2013.01); *B60C 23/0415* (2013.01); *B60C 23/0454* (2013.01); *B60C 23/0481* (2013.01); *B60C 23/0493* (2013.01); *B60C 23/0486* (2013.01); *B29C 73/22* (2013.01)
USPC ......................................................... 73/146

(58) Field of Classification Search
USPC ................................................. 73/146–146.8
See application file for complete search history.

(56) References Cited

U.S. PATENT DOCUMENTS 7,034,672 B2 * 4/2006 Dinello et al. ................ 340/447
7,271,709 B2 9/2007 Miller et al.
(Continued)

FOREIGN PATENT DOCUMENTS

DE 10 2005 027 104 A1 12/2006
DE 10 2007 060 861 A1 6/2009
(Continued)

OTHER PUBLICATIONS

German Search Report dated Oct. 24, 2011 w/ partial English translation (ten (10) pages).
(Continued)

*Primary Examiner* — Andre Allen
(74) *Attorney, Agent, or Firm* — Crowell & Moring LLP

(57) ABSTRACT

An arrangement of a tire pressure sensor unit on the inner wall of the tread of a vehicle tire in a retaining device for the sensor unit is provided. The retaining device is connected to the inner wall, wherein a sealing compound is applied to the inner wall, or in the case of a retaining device having a closed bottom section which is connected to the inner wall, the sealing compound is applied to the bottom section facing the sensor unit. In the event that a foreign object punctures the inner wall, or punctures the inner wall and the bottom section, the sealing compound prevents at least a short-term loss of pressure caused by the hole resulting therefrom in that the sealing compound at least almost tightly seals the hole.

14 Claims, 1 Drawing Sheet

(56) References Cited

U.S. PATENT DOCUMENTS

| | | | |
|---|---|---|---|
| 8,051,705 B2* | 11/2011 | Kobayakawa | 73/146 |
| 2005/0132792 A1 | 6/2005 | Lemense et al. | |
| 2006/0196257 A1 | 9/2006 | Shimura | |
| 2007/0240502 A1* | 10/2007 | Morinaga et al. | 73/146 |
| 2007/0289371 A1* | 12/2007 | Watanabe et al. | 73/146.3 |
| 2010/0043541 A1* | 2/2010 | Kobayakawa | 73/146 |
| 2010/0300192 A1 | 12/2010 | Isomura | |
| 2011/0240195 A1* | 10/2011 | Ellmann | 152/450 |
| 2012/0173073 A1 | 7/2012 | Hanna | |
| 2013/0049442 A1* | 2/2013 | Sheikh-Bahaie | 301/62 |
| 2013/0125640 A1* | 5/2013 | Kempf et al. | 73/146.8 |
| 2013/0261991 A1* | 10/2013 | Tebano et al. | 702/41 |
| 2013/0263655 A1* | 10/2013 | Tebano et al. | 73/146.3 |

FOREIGN PATENT DOCUMENTS

| | | |
|---|---|---|
| DE | 10 2008 053 506 A1 | 4/2010 |
| DE | 10 2009 006 707 A1 | 8/2010 |
| WO | WO 2011/060986 A1 | 5/2011 |

OTHER PUBLICATIONS

German Search Report Dated Oct. 16, 2013 w/partial English translation (nine (9) pages).

* cited by examiner

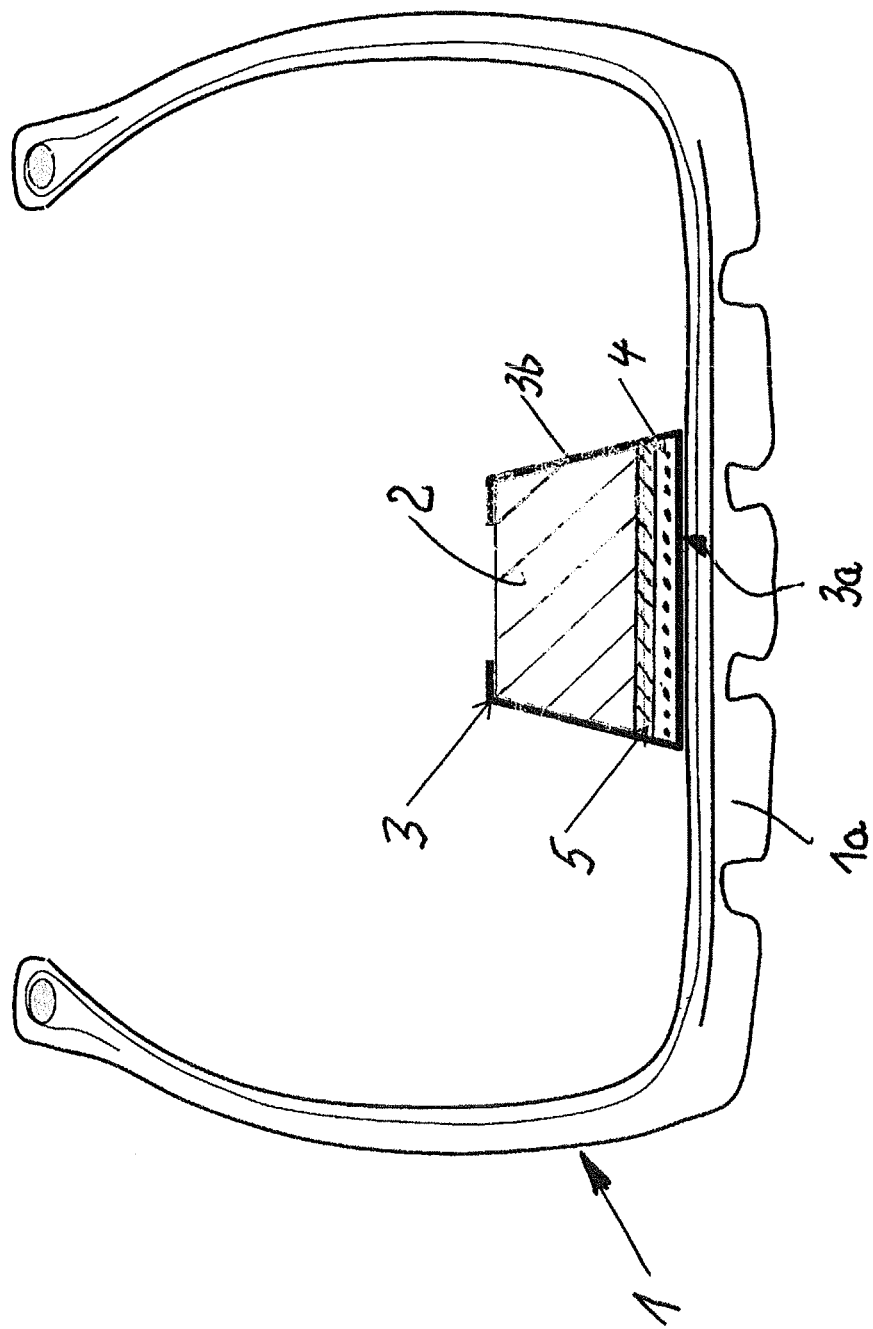

ARRANGEMENT OF A TIRE PRESSURE SENSOR UNIT

CROSS REFERENCE TO RELATED APPLICATIONS

This application is a continuation of PCT International Application No. PCT/EP2011/071554, filed Dec. 1, 2011, which claims priority under 35 U.S.C. §119 from German Patent Application No. DE 10 2011 003 134.0, filed Jan. 25, 2011, the entire disclosures of which are herein expressly incorporated by reference.

BACKGROUND AND SUMMARY OF THE INVENTION

The invention concerns the arrangement of a tire pressure sensor unit on the inner wall of the tread of a vehicle tire and in a retaining device for the sensor unit, where the retaining device is connected to the inner wall. With regard to the prior art, reference is made in particular to DE 10 2009 006 707 A1 and DE 10 2008 053 506 A1, and furthermore to DE 10 2007 060 861 A1.

Sensor units for monitoring tire pressure should reliably display a pressure loss in a vehicle tire, in particular when the tread of the tire has been punctured by an object such as a nail or the like. Along with this, in case of such damage to the tire the vehicle equipped with this tire should still be able to be moved reasonably safely over a certain distance, for which purpose an indication to the driver of the pressure loss is very helpful. Well known in connection with this are fixedly installed tire pressure sensor units and such, which are inserted in a retaining device provided on the tire and customarily consisting of rubber material. The sensor units can be removed from the retaining device once again through the use of greater force. Known also is the practice of such sensor units being equipped either with a long-life battery for providing the power needed for the sensor unit to function and/or with a device for generating electrical power, where that device customarily obtains the power from the passage of the contact patch of the tire, i.e. from the deformation of the rotating tire in the area of the respective contact patch of the tire.

If a pneumatic tire of a vehicle rolls over a nail or another sharp object lying sufficiently unfavorably on the road, then this nail or sharp object can puncture the tread of the tire. A more or less rapid pressure loss in the tire is the result. If a puncture of a tire occurs to the side of the tire pressure sensor unit, then the still functional sensor unit will as usual display a pressure loss resulting therefrom. If, however, a tire puncture occurs in the area of the tire pressure sensor unit held in a retaining device provided on the inner wall of the tire tread, then as a consequence of the puncture this sensor unit either can be damaged and thus become dysfunctional, i.e. defective, but even so still remain in the retaining device, or this sensor unit can be pressed out of the retaining device by the nail or the like. In the former case it takes a certain time thereafter until a monitoring unit, which is installed in the vehicle structure and serves to monitor the tire pressure of all the vehicle tires and telemetrically receives the signals of the individual tire pressure sensor units, indicates to the driver the functional failure of a sensor unit since not every failure in signal transmission is interpreted as a defect because that failure may be only short-term. However, even if the indication of functional failure is issued very quickly it is questionable whether the driver will take this indication as seriously as an indication of a greater pressure loss in the tire. However, even in the latter case, it is possible under adverse circumstances for a certain period of time to elapse before the driver of the vehicle receives from said monitoring unit an indication of the damaged tire and the pressure loss resulting therefrom.

Thus, there is a need for the arrangement of a tire pressure sensor unit on the inner wall of the tread of a vehicle tire, and for a retaining device for the sensor unit where the retaining device is connected to the inner wall, which ensures a high operational reliability of the vehicle in the case of a tire puncture in the area of this sensor unit.

This need is met by an arrangement of a tire pressure sensor unit on the inner wall of the tread of a vehicle tire and in a retaining device for the sensor unit, where the retaining device is connected to the inner wall, and where a sealing compound is applied to the inner wall, or in the case of a retaining device with a closed bottom section connected to the inner wall, the sealing compound is applied to that bottom section. In the case of a puncture by a foreign object penetrating the inner wall or penetrating the inner wall and the bottom section, the sealing compound prevents at least a short-term pressure loss caused by the hole resulting therefrom in that the sealing compound at least tightly seals the hole.

Since in the case of a tire puncture in the area of a tire pressure sensor unit at least over a certain period of time a pressure loss endangering the driving stability of the vehicle under unfavorable circumstances could only be registered by the driver with comparatively great delay, it is proposed with the present invention to practically rule out, in such a case, the probability of a short-term pressure loss. In order to accomplish this, on the material facing or neighboring the sensor unit and formed either by the inner wall of the tire tread or by the retaining device fastened to it, customarily by gluing, and customarily in both cases consisting of rubber, in any case or at least in the area bounded by the retaining device and in which, in any case for undamaged tires, the tire pressure sensor unit is located, a well-known sealing compound is applied. In the case of a puncture by a foreign object penetrating the inner wall or penetrating the inner wall and the retaining device, the sealing compound seals the hole resulting therefrom at least nearly tightly. With regard to such a sealing compound reference can be made, for example, to DE 10 2008 053 506 A1 mentioned above.

In DE 10 2008 053 506 A1, a vehicle pneumatic tire is described with, on the inner side of the tire, a sealing compound which, in case of damage to the tire, seals the defect with tightness resulting therefrom, where this tire is furthermore provided with an electrical warning system in the form of a network of electrical wires covering the sealing compound or the inner side of the tire. In case of damage to the tire that network issues a warning message. The warning system described in DE 10 2008 053 506 A1 is therefore significantly different from a tire pressure sensor unit, which is the subject of the present invention. In this context let it be mentioned that in connection with a tire pressure sensor unit arrangement according to the invention, it would indeed be favorable in regard to the operational reliability of the vehicle to also provide the entire inner side of the tire over its full surface with such a sealing compound with an additional warning system, but thereby the weight of the tire would be increased in a disadvantageous manner and such a tire would be too expensive. In contrast thereto and more favorable is the present invention's proposal of essentially providing only the area more or less below the sensor unit with such a sealing compound, where according to the invention it is also the case that no additional warning system is needed on account of the tire pressure sensor unit.

For the present invention, a distinction is made between a retaining device with a closed bottom section which is connected to the inner wall of the tire and which will be explained in still more detail at a later point as an embodiment example represented in a figure, and, simplified with respect thereto, a retaining device without such a closed bottom section. With a here so-called closed bottom section the retaining device is represented more or less as a box closed to the inner wall of the tire tread or as a basket which has a bottom and receives the sensor unit and where this bottom is customarily connected over its full surface to the inner side of the tire or its tread, in particular is glued or vulcanized on. In such a case the sealing compound is applied to the retaining device's bottom section's side facing the sensor unit, where it is possible to do this in a simple manner since the retaining device customarily consists of a rubber material comparable to the material of the tire. If, on the other hand, the retaining device is formed essentially only by side walls, supports or the like without such a bottom section, where the side wall or supports are mounted on the inner side of the tire and essentially hold the sensor unit in abutment with the tire's inner wall, then the sealing compound is obviously applied to the tire's inner wall in the area of this retaining device, where in this case the retaining device can consist of any material as long as it can be connected securely to the tire.

An arrangement according to the invention is particularly advantageous for a tire pressure sensor unit equipped with a device for generating electrical power since such a device cannot be equipped with another known measure for protecting a tire pressure sensor unit (cf. the document mentioned first in the introduction, DE 10 2009 006 707 A1), namely with a protective layer stopping a puncture, because such a reinforcing protective layer makes it difficult to obtain power from the passage of the contact patch of the tire. For purely battery-operated sensor units it can, however, be reasonable for their protection to provide them in addition on their side facing the inner wall of the tire with a puncture-stopping material or to provide between the sensor unit and the inner wall of the tire a layer of such a material. The same applies incidentally to an additional measure known from said document DE 10 2009 006 707 A1, namely the application of low-friction material on the sensor unit's side facing the inner wall of the tire.

It can be provided that the sensor unit must be electrically connected to another unit disposed in the tire, e.g. an antenna, where this electrical connection is made via at least one electrical contact point provided in the tread in the area within the retaining device. In order to ensure in this case the required electrical transmission between the contact point and the sensor unit, the sealing compound should be electrically conductive. If several electrical contact points are needed by the sensor unit for different units disposed in the tire, then it is recommended to design and/or dispose these electrical contact points in such a manner that during the mounting of the sensor unit configured in an accordingly adapted manner its positional orientation relative to the tire is visible.

A sensor unit which is held in the retaining device and can be removed from it can, in principle, be installed in another tire and thus be used again and again, but when specific data from the past, i.e. data resulting from its use in previous tires, are stored in this sensor unit, it should be ruled out that these data are used again as is described in principle in DE 10 2007 060 861 cited in the introduction. In the following, in particular for a tire pressure sensor unit arrangement according to the invention, additional advantageous possibilities are disclosed for how in the sensor unit or in its control electronics itself it can be registered that with high probability a tire change has been carried out, i.e. that either this sensor unit was mounted in another tire or a tire with this sensor unit was mounted on another wheel rim. Thus, the sensor unit can, in addition, comprise a light sensor by which, from the fact that light was incident on the sensor unit and that said incidence was determined to have occurred after a startup registered by the sensor unit, a tire change can be inferred, according to which at least some of the data already stored in the sensor unit will be blocked from further use. Furthermore, it is possible to provide in the sensor unit a checking mode for whether, in the case of a measured pressure which lies in the range of the ambient air pressure, an acceleration is registered with the acceleration sensor provided in the customary tire pressure sensor units and with the aid of said acceleration a horizontal tire and consequently installation of this sensor unit in another tire is inferred, according to which at least some of the data already stored in the sensor unit will be blocked from further use.

Other objects, advantages and novel features of the present invention will become apparent from the following detailed description of one or more preferred embodiments when considered in conjunction with the accompanying drawing.

BRIEF DESCRIPTION OF THE DRAWING

The single FIGURE is a partial cross-sectional view of a vehicle tire having a tire pressure sensor unit in accordance with an embodiment of the present invention.

DETAILED DESCRIPTION OF THE DRAWING

The accompanying single FIGURE shows a partial cross section of a vehicle tire (1) with a tire pressure sensor unit (2). In accordance with an embodiment of the invention, the tire pressure sensor unit (2) is inserted in a retaining device (3), which is glued or vulcanized on the inner side of the tread (1*a*) of the tire (1). This retaining device (3) consists of rubber material and includes a bottom section (3*a*) which is connected (glued or vulcanized on) over its full surface to the inner side of the tire tread (1*a*). The retaining device (3) furthermore includes side walls (3*b*) extending out from the tire tread (1*a*) which are formed to receive the sensor unit (2) between them and hold it in the retaining device (3). This is made possible in a simple manner due to the elasticity of the rubber material of the retaining unit (3).

Onto a side of the bottom section (3*a*) of the retaining device (3), specifically the side facing the sensor unit (2), a sealing compound (4) is applied, which in case of a puncture by a foreign body penetrating the tread (1*a*) or penetrating the inner wall of the tire and penetrating the bottom section (3*a*), the hole resulting therefrom is sealed at least nearly tightly. As an additional but not absolutely necessary further measure to protect the sensor unit (2) in case of a tire puncture in the area of this sensor unit (2) there is provided below its side facing the tread (1*a*) a layer of a puncture-stopping or low-friction material (5).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An arrangement for a vehicle tire having a tread with an inner wall, the arrangement comprising:
   a retaining device connected to the inner wall of the tread of the vehicle tire;
   a tire pressure sensor unit arranged in the retaining device;
   a tire sealing compound arranged between the sensor unit and the inner wall of the tread of the vehicle tire, wherein in an event of a puncture of the inner wall of the tread of the vehicle tire by a foreign object penetrating the inner wall, at least a short-term pressure loss due to the puncture is prevented via the sealing compound sealing the puncture at least nearly tightly.

2. The arrangement according to claim 1, wherein the retaining device comprises a closed bottom section connected to the inner wall of the tread of the vehicle tire, and wherein the sealing compound is arranged between the sensor unit and a side of the closed bottom section of the retaining device facing the sensor unit; and
   wherein in an event of a puncture by a foreign object penetrating the inner wall and the bottom section of the retaining element, a short-term pressure loss due to the puncture is prevented by the sealing compound sealing the puncture at least nearly tightly.

3. The arrangement according to claim 1, wherein the retaining device is open at a bottom section thereof connected to the inner wall of the tread of the vehicle tire, such that the sealing compound is applied to the inner wall.

4. The arrangement according to claim 1, further comprising:
   a puncture-stopping or low-friction material arranged on or between a side of the sensor unit facing the inner wall of the tread of the vehicle tire and the inner wall.

5. The arrangement according to claim 1, further comprising:
   at least one electrical contact point for the sensor unit being provided on the inner wall of the tire; and
   wherein the sealing compound is electrically conductive.

6. The arrangement according to claim 2, further comprising:
   at least one electrical contact point for the sensor unit being provided on the inner wall of the tire; and
   wherein the sealing compound is electrically conductive.

7. The arrangement according to claim 3, further comprising:
   at least one electrical contact point for the sensor unit being provided on the inner wall of the tire; and
   wherein the sealing compound is electrically conductive.

8. The arrangement according to claim 5, wherein a plurality of electrical contact points are provided and configured on the inner wall of the tire; and
   wherein the sensor unit is correspondingly configured in association with the plurality of electrical contact points, the configuration of the plurality of electrical contact points providing a visible positional orientation for mounting of the correspondingly configured sensor unit.

9. The arrangement according to claim 6, wherein a plurality of electrical contact points are provided and configured on the inner wall of the tire; and
   wherein the sensor unit is correspondingly configured in association with the plurality of electrical contact points, the configuration of the plurality of electrical contact points providing a visible positional orientation for mounting of the correspondingly configured sensor unit.

10. The arrangement according to claim 7, wherein a plurality of electrical contact points are provided and configured on the inner wall of the tire; and
    wherein the sensor unit is correspondingly configured in association with the plurality of electrical contact points, the configuration of the plurality of electrical contact points providing a visible positional orientation for mounting of the correspondingly configured sensor unit.

11. The arrangement according to claim 1, wherein the sensor unit comprises:
    a data store configured to store data associated with the vehicle tire; and
    a light sensor detecting light incident on the sensor unit after a startup is registered by the sensor unit, whereby installation of the sensor unit in another vehicle tire is inferable by the incident light that occurred after the startup registered by the sensor unit.

12. The arrangement according to claim 11, wherein the sensor unit is operatively configured to block use of at least some of the data stored in the data store upon inferring that the sensor unit was installed in another vehicle tire.

13. The arrangement according to claim 1, wherein the sensor unit is operatively configured to provide a check mode for whether, in a case of a measured pressure lying in a range of ambient air pressure, an acceleration is registered in order to infer whether the vehicle tire is horizontally arranged in order to infer an installation of the sensor unit in another vehicle tire.

14. The arrangement according to claim 13, wherein the sensor unit comprises a data store for storing data associated with the vehicle tire; and
    wherein upon inferring the sensor unit was installed in another vehicle tire, at least some of the data stored in the data store is blocked from further use.

* * * * *